(12) United States Patent
Rosenthal et al.

(10) Patent No.: US 12,404,937 B2
(45) Date of Patent: Sep. 2, 2025

(54) VALVE FOR REGULATING THE FLOW OF A MEDIUM

(71) Applicant: Viega Technology GmbH & Co. KG, Attendorn (DE)

(72) Inventors: Jörg Rosenthal, Reichshof-Eckenhagen (DE); Jan Wessels, Olpe (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 0 days.

(21) Appl. No.: 18/577,493

(22) PCT Filed: Jun. 22, 2022

(86) PCT No.: PCT/EP2022/066994
§ 371 (c)(1),
(2) Date: Jan. 8, 2024

(87) PCT Pub. No.: WO2023/280567
PCT Pub. Date: Jan. 12, 2023

(65) Prior Publication Data
US 2024/0353011 A1      Oct. 24, 2024

(30) Foreign Application Priority Data

Jul. 9, 2021   (DE) .................... 10 2021 117 773.1

(51) Int. Cl.
*F16K 3/08*   (2006.01)
*F16K 3/02*   (2006.01)
*F16K 3/314*   (2006.01)

(52) U.S. Cl.
CPC ............. *F16K 3/085* (2013.01); *F16K 3/029* (2013.01); *F16K 3/314* (2013.01)

(58) Field of Classification Search
CPC ........... F16K 3/085; F16K 3/029; F16K 3/314
(Continued)

(56) References Cited

U.S. PATENT DOCUMENTS

| 1,806,530 A | 5/1931 | Giesler |
| 3,396,904 A | 8/1968 | Janette |

(Continued)

FOREIGN PATENT DOCUMENTS

| DE | 19641545 A1 | 4/1998 |
| DE | 10146625 A1 | 5/2003 |

(Continued)

*Primary Examiner* — John Bastianelli
(74) *Attorney, Agent, or Firm* — The Webb Law Firm (57) ABSTRACT

A valve for regulating the flow of a medium, with a housing, with at least three valve discs, wherein at least one valve disc is arranged in the housing so as to be non-rotatable, wherein at least two valve discs are arranged so as to be rotatable relative to the at least one valve disc arranged so as to be non-rotatable, wherein the valve discs each have at least one passage opening, wherein the passage openings are designed in such a way that in a first relative position of the valve discs the flow of the medium is blocked and in a second relative position the flow is maximally open and wherein the passage openings are formed in such a way, that in the second relative position the passage openings of the valve discs expose an opening area of more than 50%, preferably more than 60%, particularly preferably more than 65%, of the area of the flow cross-section.

11 Claims, 10 Drawing Sheets

(58) Field of Classification Search
USPC .............................. 251/208, 304; 137/625.31
See application file for complete search history.

(56) References Cited

U.S. PATENT DOCUMENTS

| | | | | |
|---|---|---|---|---|
| 4,549,579 | A * | 10/1985 | Bergmann | F16K 3/085 |
| | | | | 137/625.21 |
| 4,554,948 | A * | 11/1985 | Bergmann | F16K 3/085 |
| | | | | 251/304 |
| 4,674,537 | A * | 6/1987 | Bergmann | F16K 3/085 |
| | | | | 251/208 |
| 6,192,922 | B1 | 2/2001 | MacGibbon et al. | |
| 7,726,338 | B2 * | 6/2010 | Clasen | F16K 3/085 |
| | | | | 251/304 |
| 8,210,205 | B2 * | 7/2012 | Michaels | F16K 11/087 |
| | | | | 137/625.46 |
| 9,028,546 | B2 * | 5/2015 | Forsell | A61F 2/2421 |
| | | | | 623/2.34 |
| 2005/0126646 | A1 * | 6/2005 | Hempelmann | F16K 3/085 |
| | | | | 137/624.11 |
| 2008/0245897 | A1 | 10/2008 | Nobili | |
| 2011/0260087 | A1 | 10/2011 | Perr et al. | |
| 2015/0099456 | A1 | 4/2015 | McQueeny, Jr. et al. | |

FOREIGN PATENT DOCUMENTS

| | | |
|---|---|---|
| DE | 102004022029 A1 | 12/2005 |
| DE | 202016106030 U1 | 3/2018 |
| EP | 1884693 A1 | 2/2008 |
| GB | 213816 A | 4/1924 |
| KR | 101356606 B1 | 2/2014 |

* cited by examiner

VALVE FOR REGULATING THE FLOW OF A MEDIUM

CROSS-REFERENCE TO RELATED APPLICATIONS

This application is the United States national phase of International Application No. PCT/EP2022/066994 filed Jun. 22, 2022, and claims priority to German Patent Application No. 10 2021 117 773.1 filed Jul. 9, 2021, the disclosures of which are hereby incorporated by reference in their entireties.

BACKGROUND OF THE INVENTION

Field of the Invention

The invention relates to a valve for regulating the flow of a medium.

Valves are used to regulate the flow of media such as liquids or gases, for example in pipes, by means of which the pipes or other openings can be opened and closed in a controlled manner. Examples of such fittings are shut-off or control valves, which can be operated manually or by means of motors and which can have several connections, for example one or more inlets and one or more outlets.

Depending on the shape of the flow opening through the valve and the shape of the shut-off body, a distinction is made between different valve types.

In globe valves, for example, the shut-off body lifts vertically from an opening and releases it. In a ring valve, on the other hand, the opening is only free on the outside, for example because there is an axle in the centre. The shut-off body can be designed as a disc, cylinder, cone or truncated cone, regulating cone, ball or in the form of one or more discs. Depending on the geometry of the valve, the medium flowing through the valve can also be deflected within the valve.

For shut-off valves in particular, the aim is to minimise the pressure loss of the medium flowing through the valve when it is open, i.e. to minimise the flow resistance of the valve, so that the flow of the medium is affected as little as possible when the valve is open. In the closed state, on the other hand, the valve should prevent the medium from passing through as completely as possible and provide a tight seal.

At the same time, valves should have the best possible sealing properties so that they have a long service life and the maintenance effort and costs for repair or maintenance measures and component replacement can be minimised.

In addition, minimised actuating forces are advantageous for both manual and motor-driven valves. Low actuating forces result, among other things, in a space-saving valve design or the power required to operate the valve's drive motor can be minimised.

Electronic shut-off valves in particular rely on low-wear shut-off elements with a low actuating torque in order to ensure the function with the smallest possible actuator units over the entire service life. A small actuating element also makes it easy to operate a valve manually.

Due to their good wear properties and low actuating torques, among other things, ceramic valves are used in many valves for shutting off and regulating the flow rates, such as in single-lever mixers and mixer taps, wherein ceramic valves include valves with ceramic sealing and control discs.

For example, it is known to use two ceramic valve discs that can be rotated against each other, each with at least one opening, which is used to completely shut off the flow rate in the fitting when the valve discs are in one position relative to each other. If the openings of the two valve discs are positioned one above the other, however, the shut-off element of the fitting is open.

However, ceramic shut-off devices have high pressure losses, so that they are used almost exclusively for outlet fittings such as taps, where the pressure loss through the valve is less significant than, for example, in pipes used for water distribution.

With gate valves, a gate, for example in the form of a plate, can be pushed into the line to be blocked perpendicular to the direction of flow of the medium in order to completely close the flow of the medium to be regulated. In theory, the slide for opening the valve can be moved completely out of the line to be blocked, so that the maximum opening area of these valves can be up to 100% of the area of the flow cross-section of the medium flowing through.

The flow cross-section is understood to be the cross-section at the position where the shut-off element(s) for regulating the flow is/are located, for example where the gate valve is pushed into the medium. If such a gate valve is used in a circular pipe with a pipe diameter d, for example, a maximum opening area of 100% of the area of the flow cross-section, which corresponds to the pipe cross-section and is $A=\pi *d^2/4$, can theoretically be achieved when the valve is fully open.

In theory, the total resulting opening area of a disc valve with two valve discs with openings for regulating the flow, i.e. the cross-sectional area available for the passage of the medium to be regulated, is a maximum of 50% of the flow cross-section. In practice, however, it is less than 50% due to the overlap of the valve discs required for shut-off, as it must be ensured that the flow of the medium is blocked as completely as possible in the closed state.

For this reason, the use of disc valves, especially ceramic disc valves, as shut-off valves within distribution lines is unfavourable, for which the pressure loss is an important parameter and should be minimised as far as possible.

In addition, angle seat valves or ball valves are known from the state of the art as control or shut-off valves for regulating the flow of media in pipes or tubes, for example drinking water in drinking water installations. However, these and other forms of shut-off valves have other disadvantages.

For example, ball valves have higher actuating torques and are more susceptible to wear. Angle seat valves have disadvantages when adapting an electronic actuator due to the linear stroke, especially as the rotary movement of widely used electric motors first requires a translation into a linear movement. This has a detrimental effect, for example, on the design effort and required installation space as well as on the closing time of the valve.

Description of Related Art

KR 101 356 606 B1 describes a throttle valve with three valve disks, two of which are arranged to rotate relative to the other disk by means of a drive that engages in guides in these disks.

U.S. Pat. No. 6,192,922 B1 relates to a valve for flow regulation with a fixed disk and two disks arranged to rotate relative to this disk, whereby rotation of one of the rotatable disks also rotates the other rotatable disk.

U.S. Pat. No. 1,806,530 describes a valve for flow regulation which can be inserted into a pipe and which has a fixed valve disk and two valve disks which can rotate relative to this disk. The rotatable valve disks are driven by rotation of a valve stem.

US 2011/0260087 A1 describes a rotary valve with two stators and at least two rotors, each with circular segment-shaped passage openings, whereby in a fully open position the maximum passage area of the valve is dependent on the number of rotors.

U.S. Pat. No. 3,396,904 describes an adjustable valve with a housing in which a permanently installed valve disk is arranged. Two rotatable valve disks are also provided, the movement of each of which is limited by end stops relative to the fixed valve disk.

SUMMARY OF THE INVENTION

Therefore, the present invention is based on the technical problem of providing a valve for regulating the flow of a medium which improves the disadvantages described for the prior art and, in particular, minimises the pressure loss.

The above technical problem is solved according to the invention by a valve for regulating the flow of a medium, with a housing and with at least three valve discs, wherein at least one valve disc is arranged in the housing so as to be non-rotatable, wherein at least two valve discs are arranged so as to be rotatable relative to the at least one valve disc arranged so as to be non-rotatable, wherein the valve discs each have at least one passage opening wherein the passage openings are designed in such a way that in a first relative position of the valve discs the flow of the medium is blocked and in a second relative position it is maximally open and wherein the passage openings are designed in such a way that in the second relative position the passage openings of the valve discs expose an opening area of more than 50%, preferably more than 60%, particularly preferably more than 65%, of the area of the flow cross-section, wherein the valve discs have an identical geometry.

Thus, a valve is provided which has an enlarged opening area compared to the valves known from the prior art, so that the pressure loss can be reduced. In this way, it is also possible to use the valve according to the invention at positions, in particular in lines, where a low pressure loss is important. The flexibility of the possible use of valves is thus increased by the valve discs with passage openings according to the invention.

In the first relative position of the valve discs, the flow of the medium is blocked according to the invention. A blocked flow is understood to mean that the valve essentially completely blocks the flow and, for example, tightly seals off a line to be blocked, such as a water or gas line. However, it may also be possible to allow certain leakage flows of the medium to be regulated in the first relative position. It may also be provided that tightness is only guaranteed in the first relative position with certain media or with certain media properties, such as up to a certain vapour pressure of a liquid.

Furthermore, according to the invention, the flow of the medium is maximally open in a second relative position. In the context of the invention, a maximum opening is understood to mean the maximum achievable passage area of the medium flowing through due to the geometry of the valve.

In the context of the invention, the area of the flow cross-section is understood as the area that corresponds to the cross-section of the medium flowing through the valve at the position at which the shut-off elements for regulating the flow, in this case the valve discs, are located.

When using more than two valve discs to regulate the flow, the maximum total opening area of a valve can be increased. In theory, the total opening area resulting from the use of more than two valve discs is over 50% of the area of the flow cross-section. Thus, when using three valve discs, a maximum total opening area of ⅔ of the area of the flow cross-section can be achieved.

If more than three valve discs are used, the maximum opening area can be further increased. For example, when using four valve discs, a maximum opening area of ¾ (75%) of the area of the flow cross-section can be achieved in theory. It has been recognised that, in general, for a valve using at least two valve discs, which is intended to completely block the flow of the medium to be regulated in a relative first position of the valve discs to one another, a maximum opening area of $(n-1)/n$ can generally be achieved in theory for n valve discs used. In order to achieve a flow blockage in a first position and the maximum possible opening area in a second position, it is necessary for the valve discs to be movable relative to each other and each have at least one passage opening.

Preferably, the valve discs are mounted on a common axis, in particular centrically, and can be rotated about this axis. This enables a particularly simple and space-saving design of the valve and thus leads to low manufacturing costs and a small installation space required at the destination of the valve.

The housing can be designed in one or more parts. In the case of a multi-part housing, sealing elements, preferably sealing rings, in particular O-rings made of suitable plastics, can be used to seal the housing parts together so that the medium to be regulated cannot escape from the valve. Recesses can be provided in the housing parts for the sealing elements, in particular grooves, for example for the use of sealing rings.

The valve discs have an identical geometry. In this way the production of the valve can be simplified to a particularly high degree and thus made more cost-effective.

The valve according to the invention provides a way of reducing the pressure loss through the valve disc construction and allowing a larger passage area for the medium to be regulated. The reduction in pressure loss represents a considerable advantage over disc valves known from the prior art. As the pressure loss is decisive, in this way, the investment costs can be reduced by minimising the pipe dimensions. In addition, the reduced pipe volume resulting from smaller pipe dimensions and the higher flow velocities have a positive effect on hygiene.

The medium to be regulated can be a liquid, such as water, or a gas. The valve can be used as an electronic shut-off and control valve. For example, it can be used to shut off a house or flat in combination with a leakage protection system so that the valve can shut off a pipe leading to the house or flat if a leakage is detected.

It can also be used for flow control in drinking water circulation systems.

Or for the control of hydronic balancing in heating systems and as a line, floor, flat or house shut-offs in drinking water and heating systems are conceivable.

Various preferred embodiments of the valve are described below.

In a first embodiment of the valve, the valve discs include a ceramic material. In particular, the valve discs are made of a ceramic material. Only a coating made of a ceramic material can also be provided.

Ceramic components for valves, in particular valve discs, have good wear properties, so that a valve with a long service life can be specified. In addition, valves with valve discs made of ceramic material are characterised by low actuating forces and therefore low actuating torques, resulting in simplified operation and control of the valves. In particular, these valves can be easily combined with standard stepper motors. This increases the overall flexibility of the possible applications and uses of the valve. The forces applied to the valve components can also be reduced.

The possibility of automation also makes it possible to use the valve with electronic systems, for example in leakage protection systems with an automatic shut-off function when a leak is detected. The combination of the reduced pressure loss due to the valve disc design and the advantages of ceramic valves results in a versatile valve that enables the use of ceramic valves for applications where a low pressure loss is essential.

Possible ceramic materials are silicon carbide (SiC), aluminium oxide ($Al_2O_3$) or zirconium oxide ceramic ($ZrO_2$). These materials have proven to be particularly low-wear and therefore suitable for use in valves. Silicon carbide (SiC), titanium nitride (TiN) or DLC (Diamond-Like Carbon) are particularly advantageous as ceramic coatings for valve discs. Ceramic materials are characterised in particular by their good chemical resistance as well as high hardness and compressive strength up to high temperature ranges. They therefore enable the use of valves to regulate a variety of media in conditions that are too aggressive for other materials, such as steels.

In a further embodiment of the valve, the passage openings are essentially designed as circular sectors and the circular sectors each have an opening angle $\alpha$ of greater than 180°, preferably greater than 200°, particularly preferably 240°.

Passage openings designed essentially as circular sectors are advantageously suitable for use with rotatable valve discs. Essentially circular sector-shaped openings are understood to be openings that have the shape of a circular sector, but in which there may be small deviations from the shape of a circular sector due to recesses or protrusions. For example, the corners of the circular sector can be slightly rounded.

In this way, the maximum available flow cross-section can be optimally utilised through the passage openings, for example with a circular cross-section of the pipe to be blocked. With three valve discs that each have circular sectors a of greater than 180° or greater than 200° or 240°, an opening area for the passage of the medium to be regulated in the form of a circular sector with a maximum opening angle of more than 180° or more than 200° or 240° can be achieved in the second relative position of the valve discs. This means that a maximum opening area of up to ⅔ of the flow cross-section can be achieved.

The opening angles of the valve discs can be the same size. Different opening angles are also possible. In particular, the openings can be geometrically congruent. The outer shape of the valve discs can essentially correspond to a circular shape, but shapes deviating from a circular shape are also possible, for example valve discs with corners, edges or recesses.

In a further embodiment of the valve, the valve discs each have at least two passage openings, the passage openings are essentially designed as circular sectors and the circular sectors each have an opening angle $\alpha$ of greater than 90°, preferably greater than 100°, particularly preferably 120°.

If two or more passage openings are specified for one valve disc each, the stability of the individual valve discs and therefore of the valve can be increased, preferably while the passage area per valve disc remains the same. The increased stability is achieved by reducing the contiguous free passage area. For example, webs, preferably radially towards the axis of rotation of the valve disc, can be provided between the circular sectors designed as circular sectors.

For example, valve discs with passage openings in the form of circular sectors with an opening angle $\alpha$ of 120° can also achieve a maximum opening area of up to ⅔ of the flow cross-section, depending on the thickness of the webs. At the same time, the stability of the valve disc is increased by providing two openings instead of just one per valve disc. Increased stability contributes favourably to reduced valve closure and a longer service life.

In addition, ceramic materials are lighter than other materials used for valves, which means that less force is required to move the valve discs made of ceramic materials.

In a further embodiment of the valve, a driver structure is provided for rotating the rotatable valve discs from the first position into the second position of the valve discs, and wherein the driver construction causes the rotation of at least one second rotatable valve disc, preferably all further rotatable valve discs, upon rotation of at least one first rotatable valve disc.

By providing a driver construction, at least one second rotatable valve disc can thus be rotated with the rotation of at least one actively rotated rotatable valve disc, wherein the rotation of the rotatable valve discs takes place in each case relative to the rotationally fixed valve disc and thus relative to the housing. In this way, the movement of a single or at least a few valve discs can cause the movement of all or at least several of the rotatable valve discs, so that simplified operation and control of the valve is achieved. For example, the valve can be opened or closed to the maximum or set to intermediate positions with a single movement.

Preferably, the movement, in particular rotation, of the valve discs by means of the driver structure during rotation of a rotatable valve disc is based on mechanical entrainment of at least one other rotatable valve disc. Preferably, driver elements are provided for this purpose, which enable the valve discs and the driver structure to engage mechanically during a rotary movement.

It is also possible that the entrainment is at least partially based on static friction effects between neighbouring valve discs. For this purpose, the valve discs can, for example, be mounted on a common axis and arranged adjacent to each other so that the friction surface between neighbouring valve discs is as large as possible.

It is also possible to provide latching elements on one or more valve discs and/or on other elements, for example in the form of latching lugs and counter-shaped recesses, as part of the driver design.

The actively rotated valve disc or valve discs can be rotated manually or by means of a motorised drive, for example a stepper motor can be used.

As an alternative to the described coupling of the rotary movement of the valve discs to each other, independent rotation of the valve discs from each other can also be provided. For example, the valve discs can be individually rotated manually or controlled by a motor. According to the alternative, spacers can be advantageously provided to reduce the static friction between the valve discs so that co-rotation is prevented. Turning the discs independently of each other makes it easier to fine-tune the degree to which the valve opens.

In a further embodiment of the valve, the housing has a rotatable insert and the first rotatable valve disc is arranged in the insert in a rotationally fixed manner.

In this way, rotation of the insert can cause the first rotatable valve disc to rotate. Further rotatable valve discs, in particular a second rotatable valve disc, can also be moved by the driver design. In particular, the first rotatable valve disc is arranged fixedly in the insert and the fixedly arranged valve disc is arranged fixedly in the housing and the second rotatable valve disc or the further rotatable valve discs are arranged between the two first-mentioned valve discs and are each rotatable relative to these.

In the case of three valve discs, for example, the second rotatable valve disc can rotate relative to the valve disc that is fixed in the housing and the valve disc that is fixed in the insert. The valve disc arranged fixed in the insert can also rotate relative to the valve disc arranged fixed in the housing.

On the inside of the insert and on the inside of the part of the housing in which the non-rotatable valve disc is arranged, slide rails can be provided in which the second rotatable valve disc and/or the other rotatable valve discs are arranged so that they can rotate. In particular, the second rotatable valve disc and/or the further rotatable valve discs can be arranged at least partially in the insert and in a further part of the housing.

Preferably, grooves are provided in the circumferential direction of the insert to accommodate sealing elements, in particular sealing rings, which seal the insert against the housing so that the medium to be regulated cannot flow past it.

A sliding element, preferably consisting at least partially of a polymer, in particular polytetrafluoroethylene (PTFE), can be provided between the insert and at least one part of the housing relative to which the insert is rotated. In particular, the sliding element can be designed as a sliding disc or sliding ring. With the aid of the sliding element, less friction is achieved between the insert and the housing, so that lower rotational forces have to be applied.

In a further embodiment of the valve, a handle is provided on the outside of the housing and actuation of the handle causes the insert to rotate.

This makes the valve easy to operate. The provision of a handle also enables a geometrically simple design and therefore low manufacturing costs for the valve. Furthermore, a handle on the outside of the housing makes it easier to visualise the position of the valve, i.e. whether it is in the closed or open position, in particular the maximum open position.

In particular, the rotation of the insert can be effected by rotating the handle. A connecting element can be provided on the handle, which engages in the insert and thus moves it.

The handle is preferably attached to the housing by means of a fastening element, for example a screw or a pin, for example by attaching it to the insert. For this purpose, receptacles for the fastening element can be provided on the handle and on the insert. A recess is preferably provided on the housing, which allows the handle and therefore also the insert to be rotated within a certain angle range. This makes it easy to open and close the valve using the handle and the opening position of the valve can be easily visualised from the outside.

In a further embodiment, end stops are provided to limit the rotational movement of the rotatable valve discs.

In this way, a mechanically simple limitation of the rotation, preferably to a maximum angle relative to the non-rotating valve disc, can be achieved. Preferably, the end stops limit the rotation of the valve discs in one direction of rotation to an angle that corresponds to the first relative position of the valve discs and in the other direction of rotation to an angle that corresponds to the second relative position of the valve discs. At least two end stops are preferably provided for each valve disc. The valve discs preferably have projections extending in the radial direction on the circumferential side, which abut against the end stops in the first or second relative position, so that the rotation of the valve discs is limited.

Further stops, for example intermediate stops, can be provided which do not absolutely limit the rotation, but which require a certain amount of force to overcome, so that discrete intermediate positions can be defined between the first and second relative positions of the valve discs. In this way, a specific degree of opening of the valve can be set. For example, the intermediate stops can be designed as projections extending radially inwards on the inside of the insert and/or on the inside of the housing, in particular in the slide rails.

At the same time, the end stops can serve to reinforce the co-movement of the rotatable valve discs as part of the driver design.

The end stops make it easier to control the rotation of the valve discs, especially when using a drive motor for the rotation. In addition, the end stops can be used to ensure that the valve discs have reached the first or second relative position.

In a further embodiment, the end stops limit the rotational movement of a first rotatable valve disc to a rotation through a maximum angle $\beta$, preferably $\beta=240°$, relative to the at least one rotationally fixed valve disc and the rotational movement of at least one further rotatable valve disc to a rotation through a maximum angle $\gamma$, preferably $\gamma=120°$, relative to the at least one rotationally fixed valve disc.

The angles $\beta$ and $\gamma$ can be advantageously selected depending on the number of valve discs and the size of the openings, in particular the opening angle of the circular sectors. If, for example, there are three valve discs each with at least one passage opening in the form of a circular sector with a (total) opening angle of 240°, for example one circular sector opening with an opening angle of 240° or two or more circular sector openings with a total opening angle of 240°, such as two circular sector openings each with 120°, the end stops can advantageously limit the rotations by maximum angles $\beta=240°$ and $\gamma=120°$. In this way, the first and second relative positions of the valve discs are limited by the end stops and the largest possible maximum opening area in relation to the flow cross-section can be achieved.

In particular, the rotation of the first rotatable valve disc can be limited by the end stops to 240° by the driver structure of the actively rotated valve disc and the rotation of the second rotatable valve disc can be limited by the driver structure of the co-rotated valve disc to 120° relative to the non-rotating valve disc.

If the rotation of the actively rotated valve disc is limited to 240°, the risk of pressure surges can be reduced, as a rotation of 240° is required for the closing process instead of, for example, only 90°, as is the case with valves known from the state of the art. A water hammer or pressure surge refers to a dynamic change in pressure of the medium to be regulated, for example a fluid. As pressure hammers not only cause noise but also shorten the service life of the valve, the service life of the valve can be increased in addition to the ease of use.

In addition, a larger valve angle between the first and second relative position results in better control characteristics, especially when the valve is used in combination with discrete stepper motors, as the individual control steps can be larger.

The end stops preferably limit the rotation of the first rotatable valve disc by the driver structure, the actively rotated valve disc, to 120° and the rotation of the second rotatable valve disc by the driver structure, the co-rotated valve disc, is preferably limited to 120° relative to the non-rotating valve disc.

In a further embodiment, the end stops limit the rotational movement of the rotatable valve discs in relation to neighbouring valve discs to the same maximum angle δ, preferably δ=120°.

This enables a simple geometry for both the valve discs and the end stops and slide rails. In particular, the rotatable and also the non-rotatable valve discs can be the same valve discs, so that the manufacture of the valve is considerably simplified.

If more than three valve discs are provided, further maximum limiting angles can be provided in addition to the angles β and γ. For example, a further maximum angle ε can be provided for four valve discs. The angles β, γ and ε can limit the rotational movement of the rotatable valve discs to 90°, 180° and 270° relative to a fixed valve disc, for example. This is particularly advantageous for four valve discs, each with an opening area in the form of a circular sector with an opening angle of 90°. In this way, the maximum opening area in the second position can be increased to up to 75%.

BRIEF DESCRIPTION OF THE INVENTION

Further features and advantages of the invention are apparent from the following description of embodiments, with reference being made to the accompanying drawing. The Drawings Show FIG. 1a-d different perspective views of a first embodiment of the valve according to the invention, FIG. 2 a sectional view of the embodiment of the valve according to the invention shown in FIG. 1, FIG. 3a-b Examples of the valve discs of the valve according to the invention, FIG. 4a-b perspective views of the valve discs from FIG. 3b in the first and second relative positions, FIG. 5a-d perspective views of the insert of the embodiment example of the valve according to the invention from FIG. 1 and FIG. 6a-c perspective views of the housing part with non-rotating valve disc of the embodiment example of the valve according to the invention from FIG. 1.

DESCRIPTION OF THE INVENTION

In the following description of the various embodiments according to the invention, components and elements with the same function and the same mode of operation are provided with the same reference signs, even if the components and elements may differ in their dimensions or shape in the various embodiments.

Figure 1A:
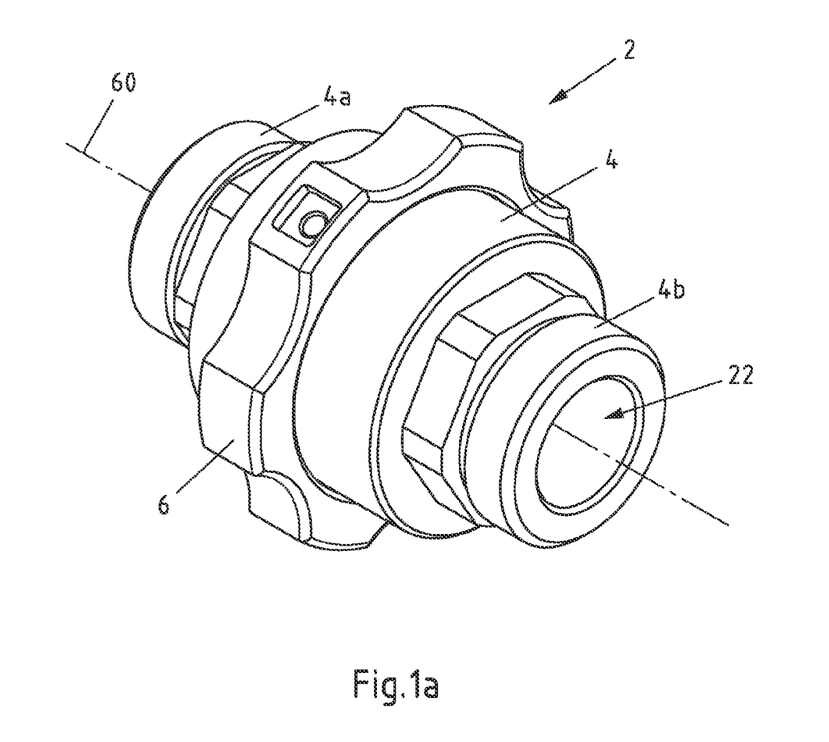
Figure 1B:
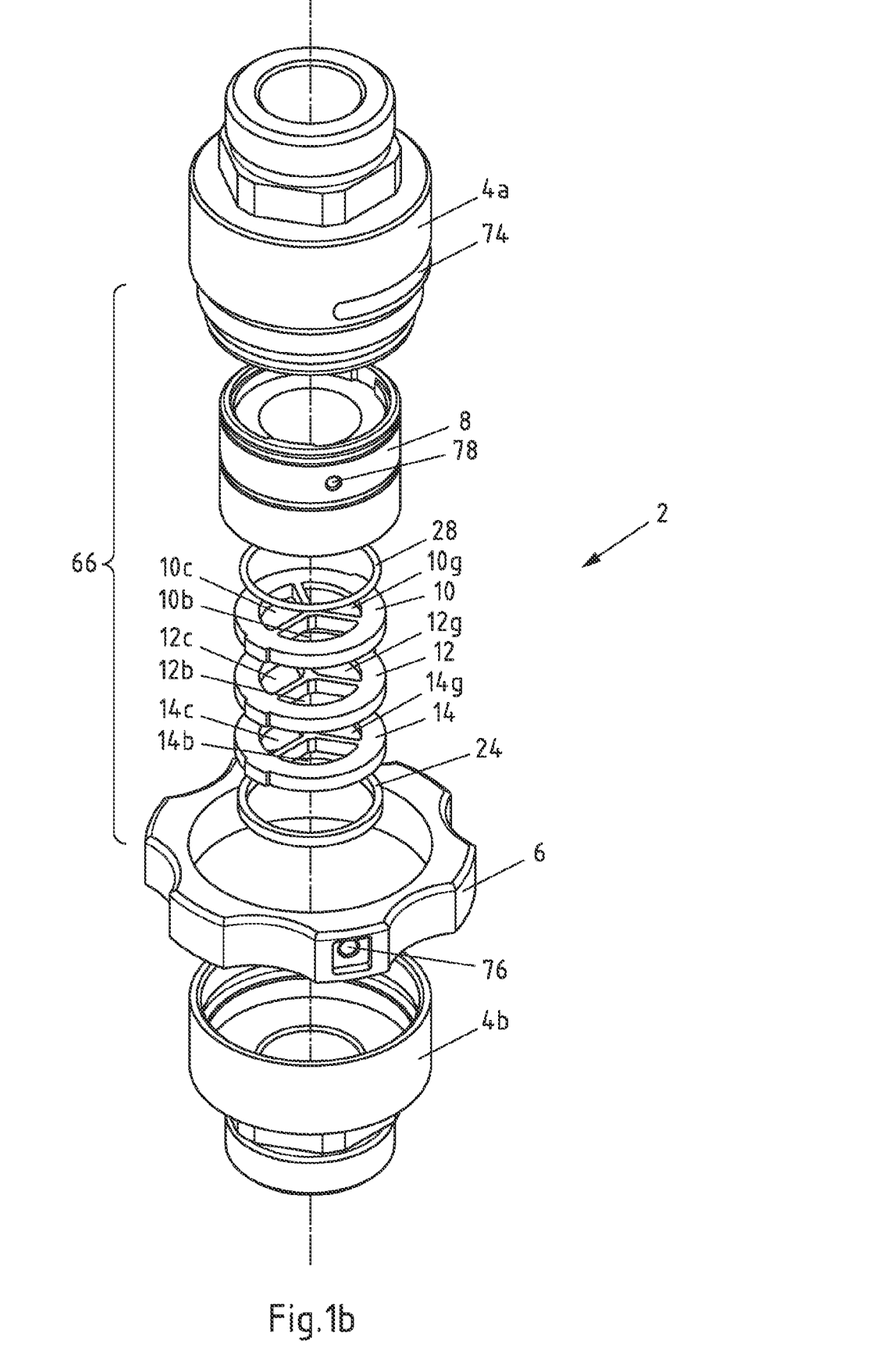
Figure 1C:
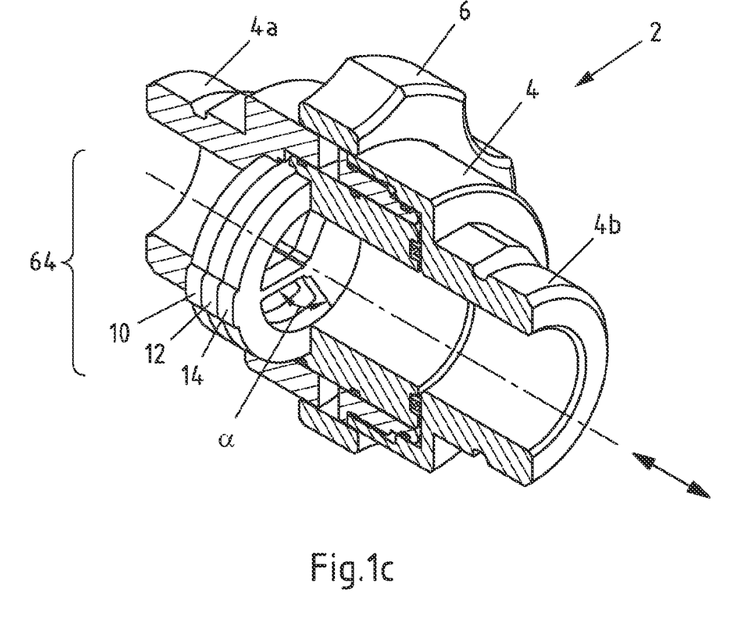
Figure 1D:
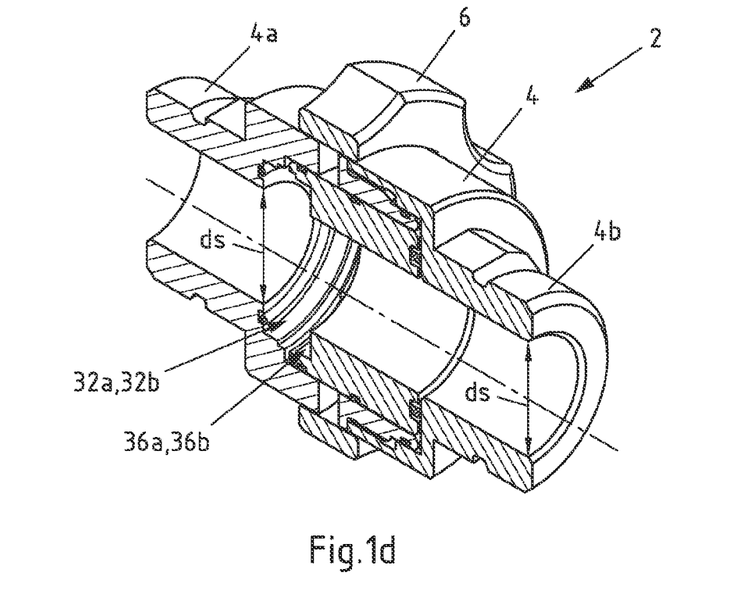

FIG. 1a shows a perspective view of a first embodiment example of the valve 2 according to the invention with three valve discs 10, 12, 14. FIG. 1b shows an exploded view of the valve 2 and FIGS. 1c and 1d show perspective sectional views of the valve 2 along the longitudinal axis 60 in FIG. 1a with and without valve discs 10, 12, 14 arranged in the housing 4 of the valve 2.

The valve disc 10 is non-rotatably arranged in the housing 4, in the housing part 4a. The rotatable discs 12 and 14 are arranged to rotate relative to the non-rotatable valve disc 10. In this embodiment example, the valve discs 10, 12, 14 each have two passage openings 10b, 10c, 12b, 12c, 14b, 14c. The passage openings 10b, 10c, 12b, 12c, 14b, 14c are each essentially designed as circular sectors and have opening angles α (see FIG. 1c) of 120° each. In the present case, the valve discs 10, 12, 14 are in the second relative position 64, in which the flow of the medium (not shown in the present case) is maximally open. This means that in this position 64, the overlap of the valve discs 10, 12, 14 in the direction of flow (double arrow in FIG. 1c) is minimal.

As shown here, the 10b, 10c, 12b, 12c, 14b, 14c in the second relative position 64 provide an opening area 20 (see FIG. 4b) of more than 60% of the area of the flow cross-section 22 (see FIG. 1a). With exact geometrical dimensions, the opening area can be more than 66%, up to ⅔, of the area of the flow cross-section 22. The pressure loss through the valve 2 can be considerably reduced by the opening area 20 of more than 60% of the area of the flow cross-section 22.

Further parts of the valve 2 can be seen in FIG. 1b. In this design example, the valve 2 has an insert 8, which can be rotated relative to the housing 4, a housing part 4b and a handle 6 in addition to the housing part 4a, in which the non-rotatable valve disc 10 is arranged. The handle 6 is designed in such a way that it engages in the insert 8 and can easily cause the insert 8 to rotate when the handle 6 is rotated. In this way, the valve 2 can be moved from the first position 62 (see FIG. 4a), valve closed, to the second position 64, valve maximally open (see FIG. 4b), and to intermediate positions in which the valve is at least partially open.

The handle 6 can be easily fastened to the housing 4, for example by fastening it to the insert 8, using a fastening element such as a screw or a pin (not shown). For this purpose, receptacles 76, 78 for a fastening element are provided on the handle 6 and on the insert 8 in the present embodiment example (see FIG. 1b). By providing a recess 74 on the housing part 4a, here in the form of a slot which extends in the circumferential direction by 240° along the outside of the housing part 4a, the rotation of the insert 8 by 240° is made possible by means of the rotation of the handle 6. This makes it easy to open and close the valve 2 using the handle 6 and the opening position of the valve 2 is also clearly visible.

Figure 2:
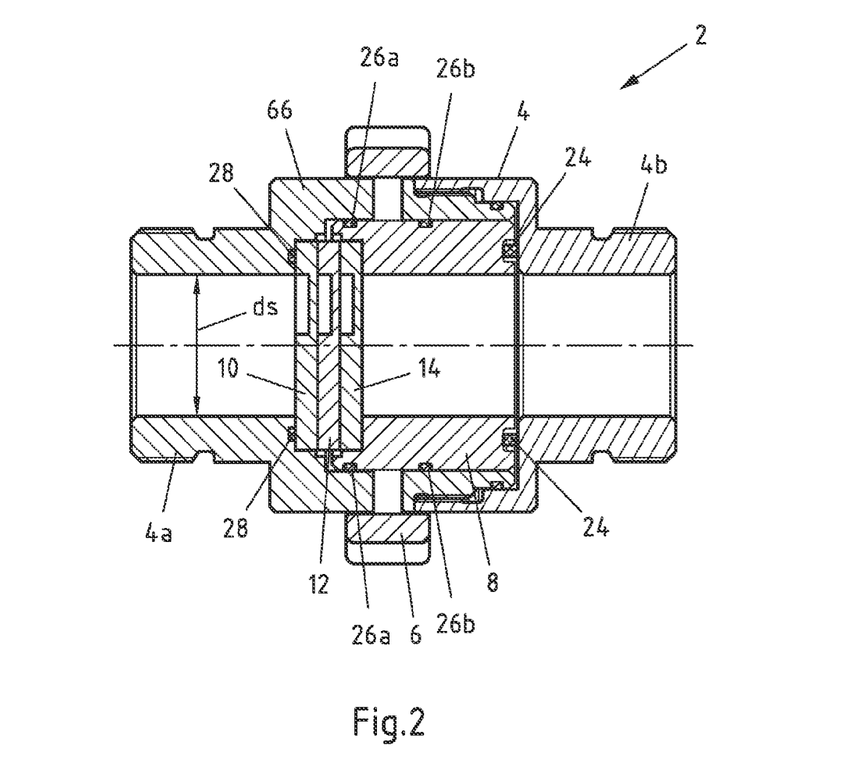

Furthermore, sealing rings 26a, 26b are provided to seal the insert 8 against the housing 4, a sealing ring 28 to seal the non-rotatable valve disc 10 against the housing 4 and a sealing ring 30 to seal the housing parts 4a, 4b against each other (see also FIG. 2).

In the embodiment example shown in FIGS. 1a to 1d, the driver construction 66 is formed by the configuration of the insert 8 together with the valve discs 10, 12, 14 and the housing part 4a.

FIGS. 1c and 1d show the arrangement of the valve discs 10, 12, 14 in the housing 4. At the position of the valve discs 10, 12, 14, the slide rails 32a, 32b provided in the housing 4 and the slide rails 36a, 36b provided in the insert can be seen as part of the driver structure 66 in FIG. 1d. The valve disc 12 is arranged to rotate along these slide rails.

Furthermore, FIG. 1d in particular shows the diameter ds of the flow cross-section 22 of the valve, which essentially corresponds to the inner circle diameter dx of the passage openings 10b, 10c, 12b, 12c, 14b, 14c (see FIG. 3b) formed as circular sectors, so that a maximum opening area 20 can be achieved in relation to the flow cross-section 22 in the second relative position 64.

FIG. 2 now shows a partially sectioned side view through the housing 4 of the valve 2 from FIGS. 1a to 1d. In this view, the positions of the sealing rings 26a, 26b, with which the insert 8 is sealed against the housing 4, of the sealing ring 28 for sealing the non-rotatable valve disc 10 against the housing 4 and of the sealing ring 30 for sealing the housing parts 4a, 4b against each other are clearly visible. The flow cross-section 22 of the valve, shown here by the indicated flow diameter ds, is essentially constant along the longitudinal axis of the housing 4. The sliding ring 24, designed here as a PTFE ring, reduces the friction between the insert 8 and the housing part 4b when the insert 8 rotates and reduces the actuating forces of the valve 2.

Figure 3A:
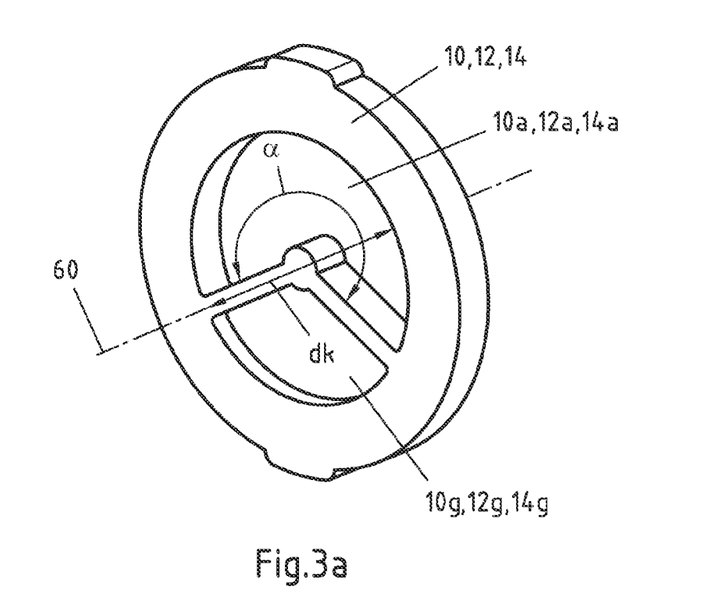
Figure 3B:
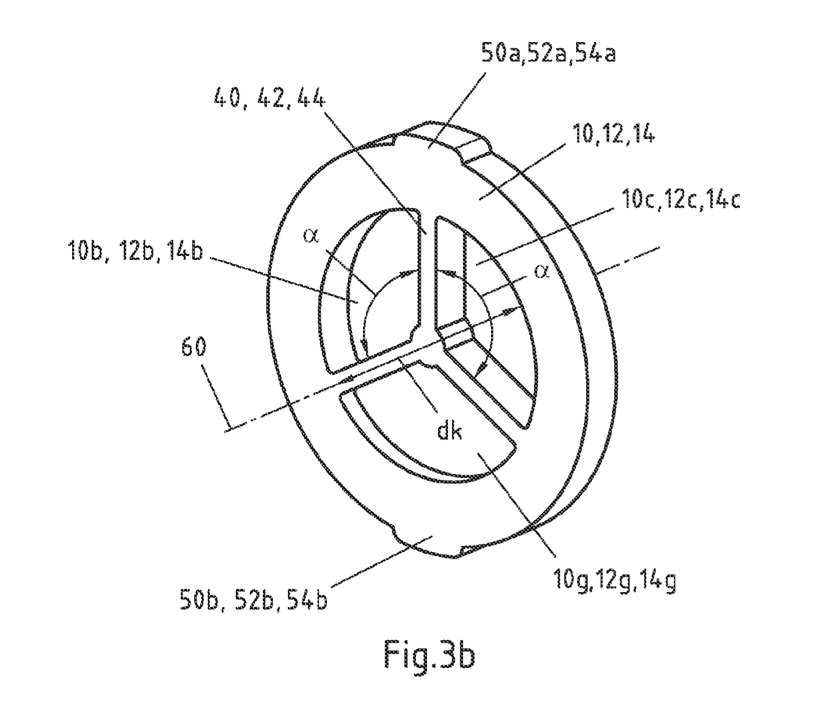

FIGS. 3a and 3b show embodiments of valve discs 10, 12, 14 according to the invention. FIG. 3a first shows a valve disc 10, 12, 14 with a passage opening 10a, 12a, 14a, which is designed as a circular sector and has an opening angle $\alpha$ of 240°. When the valve discs 10, 12, 14 rotate relative to each other about the common axis 60, the valve discs 10, 12, 14 can be arranged in a first position 62 such that the flow of the medium is blocked. In a second position 64, on the other hand, a maximum opening area 20 can be set which corresponds to a circular sector with an opening angle of 240°. In relation to a circular flow cross-section 22 with the same diameter ds as the inner diameter dx of the circular sector openings 10a, 12a, 14a, an opening area of ⅔ can therefore be achieved.

FIG. 3b now shows a valve disc 10, 12, 14 with two passage openings 10b, 10c, 12b, 12c, 14b, 14c, which are designed as a circular sector and each have an opening angle $\alpha$ of 120°. A web 40, 42, 44 is provided between the two openings. The sections 10g, 12g, 14g of the valve discs 10, 12, 14 each denote closed surfaces that block the flow of a medium.

When the valve discs 10, 12, 14 are rotated relative to each other about the common axis 60, the valve discs 10, 12, 14 can be arranged in a first position 62 (see FIG. 4a) in such a way that the flow of the medium is blocked. In a second position 64 (see FIG. 4b), on the other hand, a maximum opening area 20 can be set which corresponds to a circular sector with an opening angle $\Omega$ of almost 240°, i.e. almost ⅔ of the flow cross-section 22, since the width of the web 40, 42, 44 must be subtracted from the opening area 20 here. In the case of valve discs each with a passage opening 10a, 12a, 14a with an opening angle of 240° (see FIG. 3a), on the other hand, no web has to be taken into account for the maximum opening area and a maximum opening area 20 of up to ⅔ of the flow cross-section 22 can be achieved.

An opening area of almost ⅔ of the area of the flow cross-section can therefore be achieved for the valve discs shown in FIG. 3b in relation to a circular flow cross-section 22 with the same diameter ds as the inside diameter $d_K$ of the circular sector passage openings 10b, 10c, 12b, 12c, 14b, 14c. The stability of a single valve disc 10, 12, 14 is increased by providing a web 40, 42, 44 in each case. At the same time, the maximum opening area is in any case more than 50% of the area of the flow cross-section 22, which means a considerable reduction in pressure loss compared to valves, in particular ceramic disc valves, of the prior art.

It can also be seen in FIG. 3a and FIG. 3b that the valve discs 10, 12, 14 each have projections 50a, 50b, 52a, 52b, 54a, 54b, which interact with the end stops 34a, 34b, 38a, 38b in the insert 8 and in the housing part 4a (see FIGS. 5 and 6), so that the rotation of the valve discs 10, 12, 14 is limited to a maximum angle $\beta$, $\gamma$. The protrusions 52a, 52b, 54a, 54b, together with the end stops 34a, 34b, 38a, 38b, ensure that the rotatable valve disc 12 is driven within the framework of the driver structure 66. The protrusions 50a, 50b ensure that the valve disc 10 is arranged in the housing part 4a so that it cannot rotate.

Figure 4A:
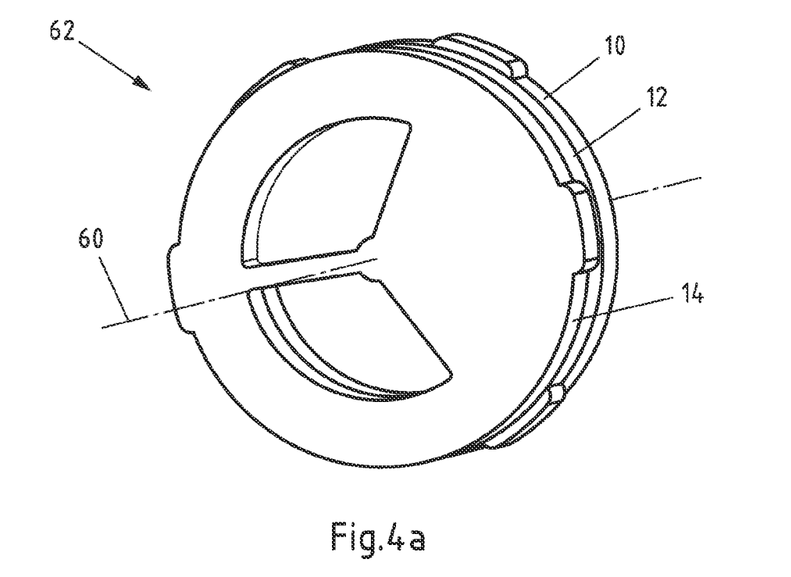

FIG. 4a initially shows the first relative position 62 of the valve discs 10, 12, 14, in which the flow of the medium in the valve 2 is blocked. The passage openings 10b, 10c, 12b, 12c, 14b, 14c of the valve discs 10, 12, 14 are not located one above the other, but a passage opening 10b, 10c, 12b, 12c, 14b, 14c, i.e. here an open circular sector of a valve disc 10, 12, 14, is covered by a part of another valve disc 10, 12, 14, which has no passage opening 10b, 10c, 12b, 12c, 14b, 14c.

Figure 4B:
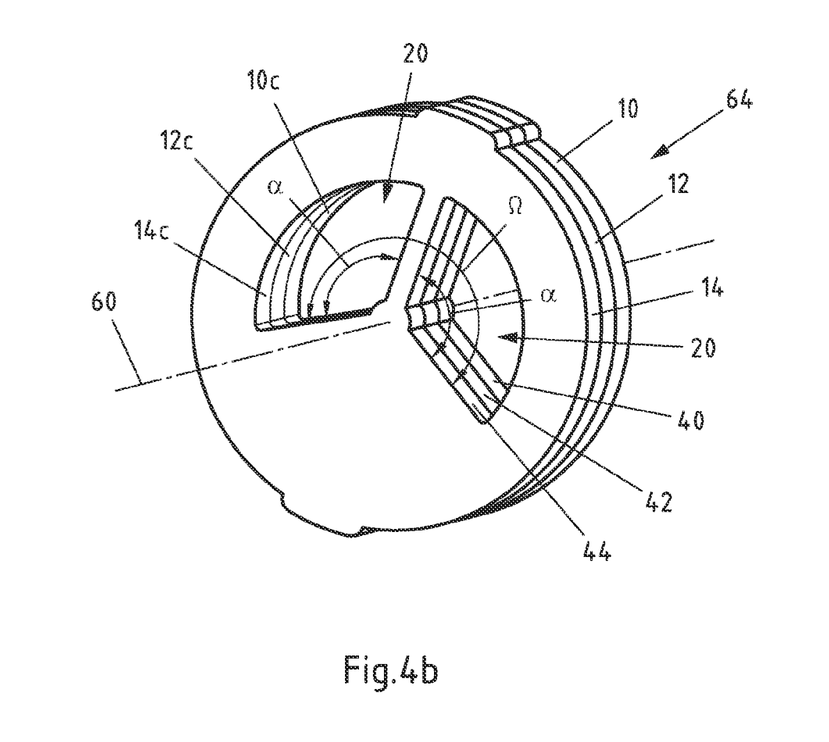

FIG. 4b now shows the second relative position 64 of the valve discs 10, 12, 14, in which the opening area 20 for the flow of the medium in the valve 2 is at a maximum. The passage openings 10b, 10c, 12b, 12c, 14b, 14c of the valve discs 10, 12, 14 are just above one another in such a way that the passage openings 10b, 10c, 12b, 12c, 14b, 14c of the valve discs 10, 12, 14 are arranged congruently one behind the other in the direction of flow.

Figure 5A:
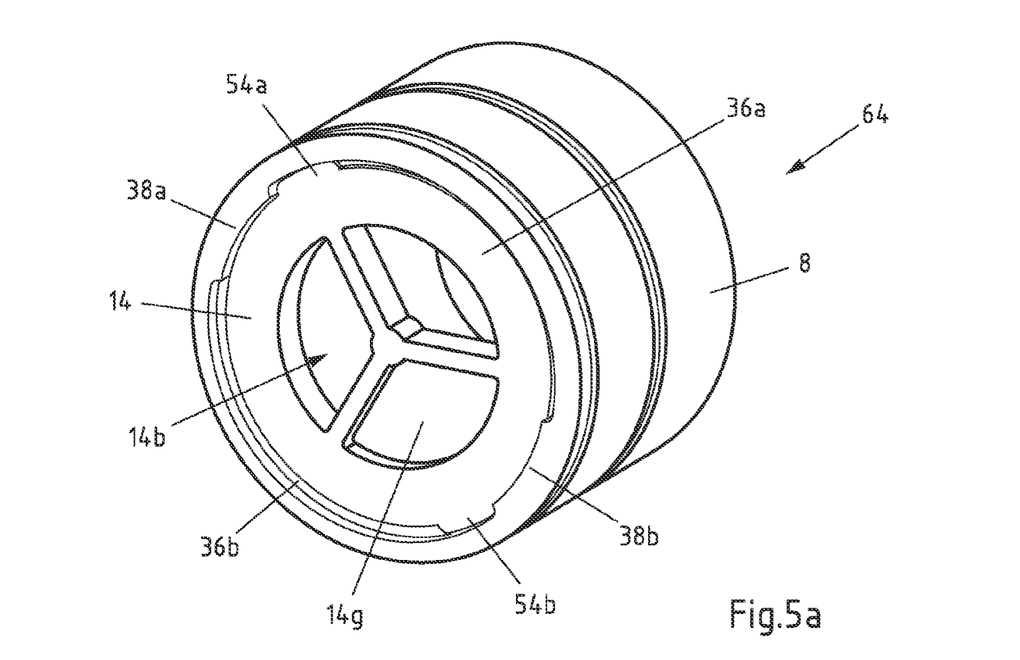
Figure 5B:
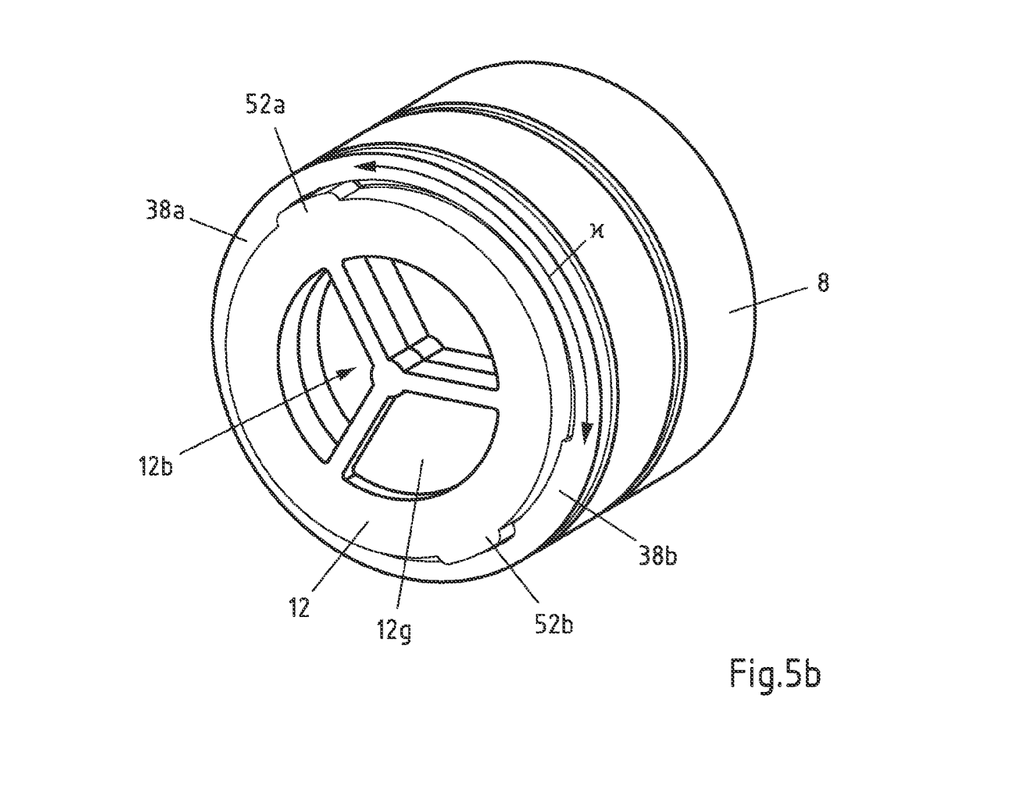
Figure 5C:
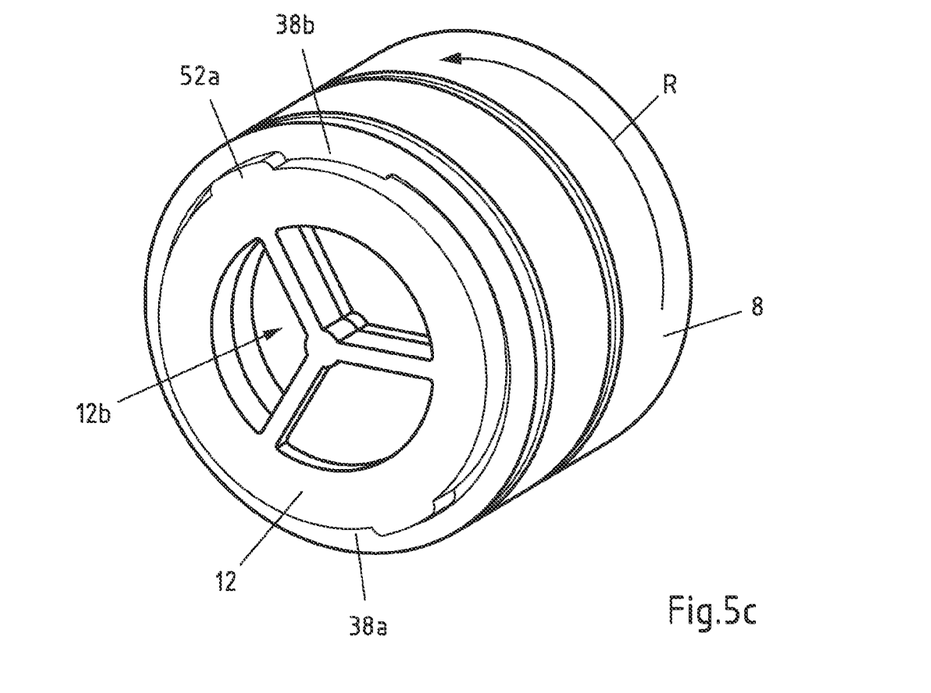
Figure 5D:
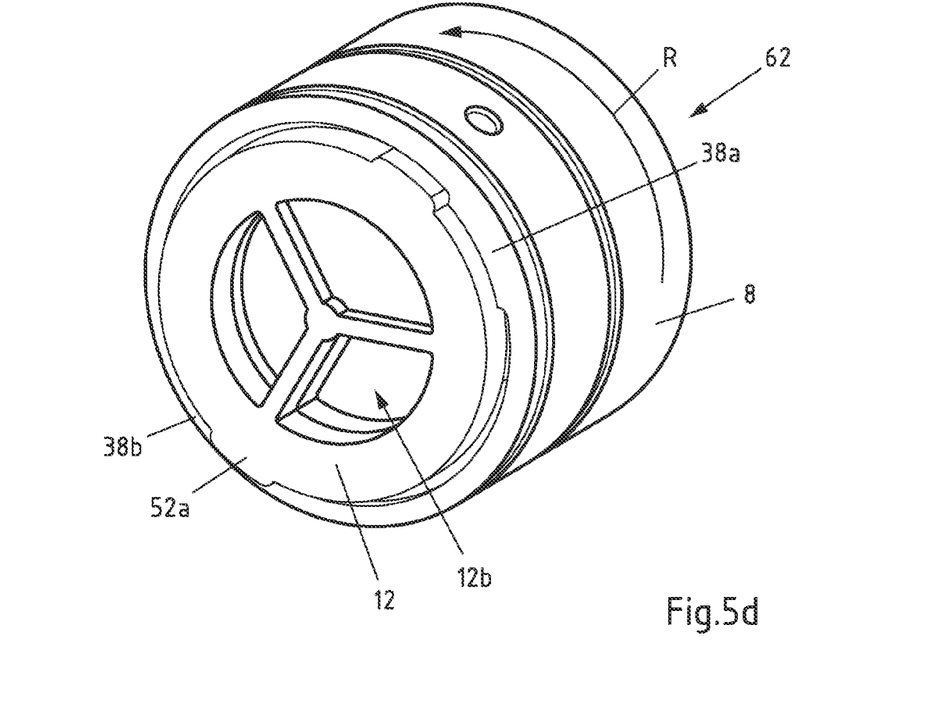
Figure 6A:
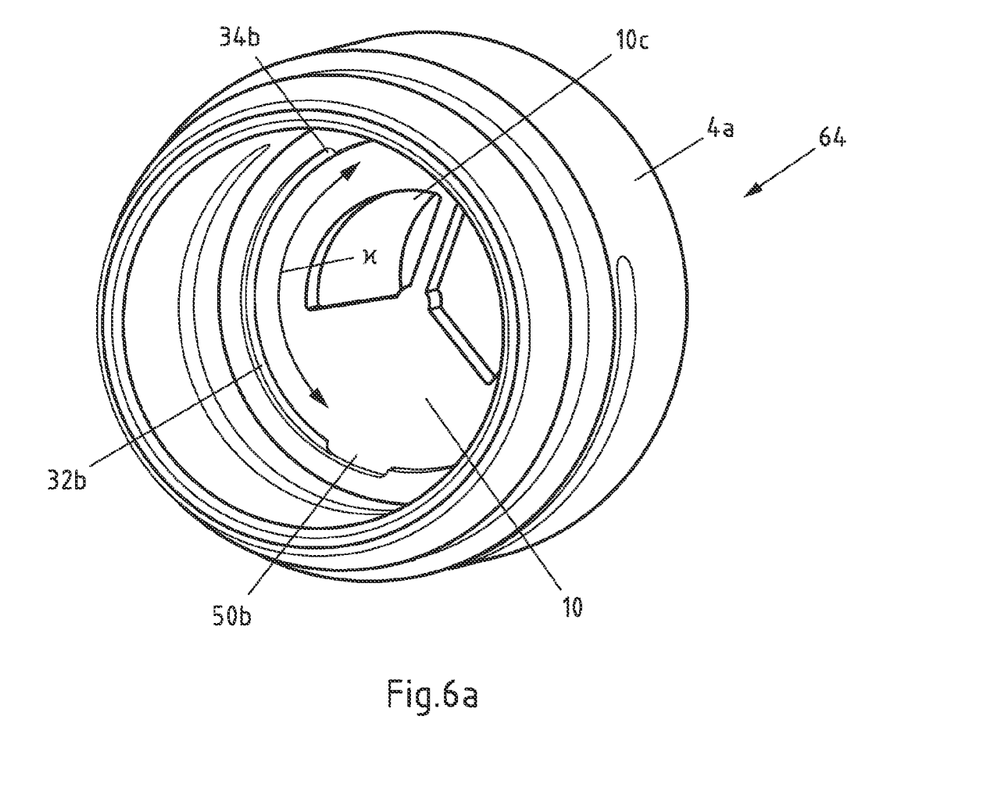
Figure 6B:
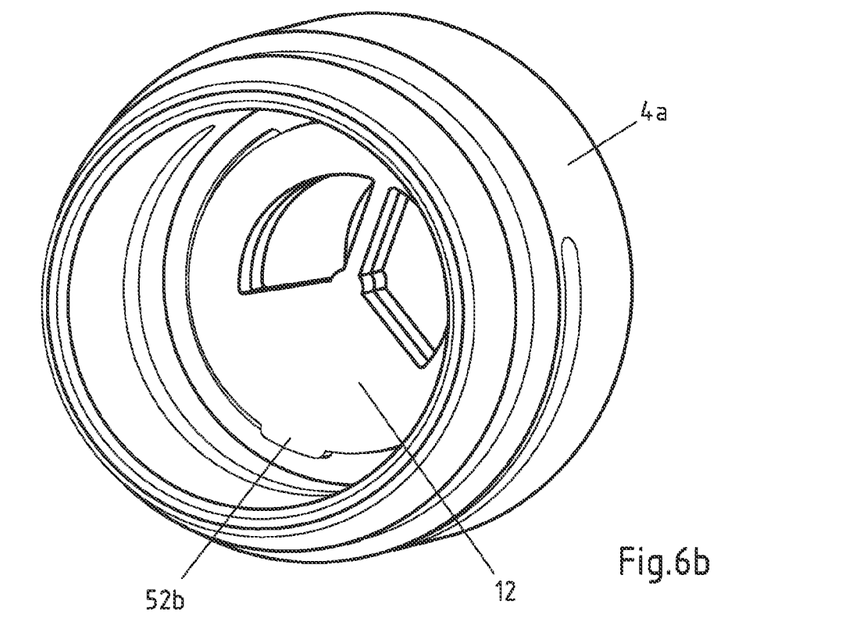
Figure 6C:
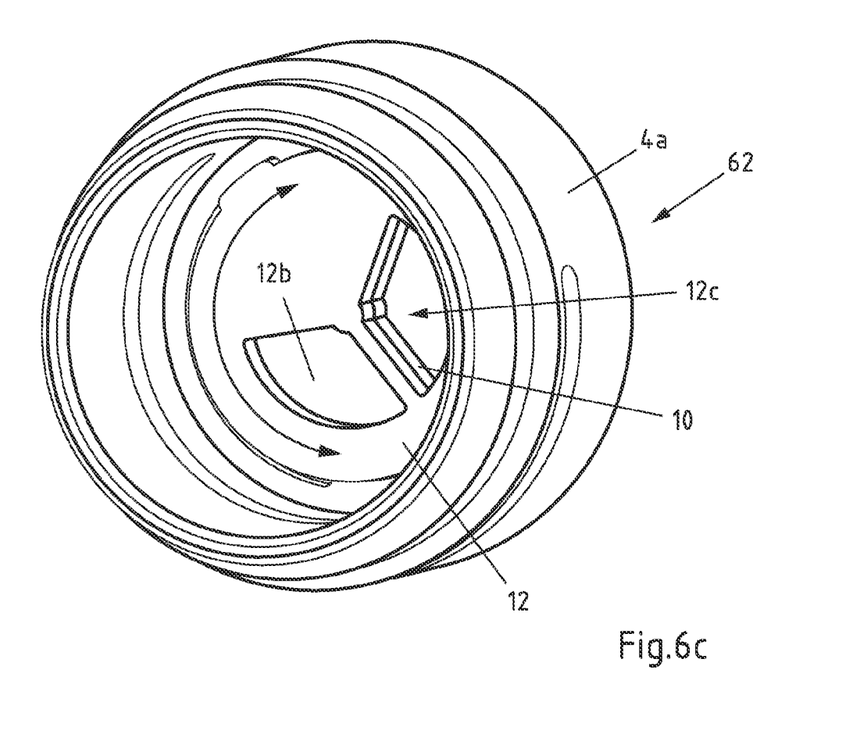

FIGS. 5 and 6 now show an actuation of the valve 2, in which the valve discs 10, 12, 14 are moved from a second position 64, in which the flow of the medium is maximally open, to a first position 62, in which the flow of the medium is blocked.

FIGS. 5a-c show the insert 8 in perspective view, FIGS. 6a-c show the housing part 4a in perspective view.

FIG. 5a first shows the insert 8 with the valve disc 14, which is fixed in it but can rotate in relation to the housing 4. The projections 54a, 54b hold the valve disc 14 rotationally fixed in the insert 8. If the insert 8 is rotated, the valve disc 14 is also rotated by the same angle. Furthermore, the insert 8 has slide rails 36a, 36b in which the rotatable valve disc 12 (shown in FIG. 5b) can rotate. End stops 38a, 38b are also provided to limit the rotational movement of the rotatable valve disc 12.

In the second position 64, the passage openings 10b, 10c, 12b, 12c, 14b, 14c of the valve discs 10, 12, 14 are arranged congruently one above the other, the overlap is maximum. If the insert 8 is now rotated relative to the housing 4, for example by means of the handle 6 or also by means of a stepper motor (not shown), the valve disc 14 is also rotated with the insert 8. FIG. 5b shows the insert 8 with the valve discs 10, 12 before rotation.

During the rotation of the handle 6 and thus the insert 8 in the angular range from 0° to 120°, the valve disc 12 does not initially rotate (see FIG. 5c). The projections 52a, 52b of the valve disc 12 move in this angular range in the slide rails 36a, 36b, which in the present case each describe an arc of a circle k over an angle of 120° and are limited by the end stops 38a, 38b, relative to the insert 8 and are simultaneously fixed relative to the slide rails 32a, 32b of the housing part 4a. The valve disc 14 in the insert 8 has rotated by 120° relative to the valve disc 12 after the insert 8 has rotated by 120°.

After a rotation (direction of rotation according to rotation arrow R in FIG. 5c) of the insert 8 by 120°, the projections 52a, 52b of the valve disc 12 rest against the end stops 38a, 38b (see FIG. 5c), wherein the end stop 38b rests against the projection 52a and the end stop 38a rests against the projection 52b. Now only the passage surface 12b is not covered by the valve disc 14.

If the insert 8 is now rotated further in the angular range of 120° to 240°, caused by rotation of the handle 6, relative to the non-rotatable valve disc 10, the valve disc 12 is locked in the direction of rotation relative to the insert 8 and the valve disc 14 by means of the projections 52a, 52b and the end stops 38a, 38b. This is shown in FIG. 5d.

At the same time, the valve disc 12 is rotated relative to the housing part 4a, the projections 52a, 52b move in the slide rails 32a, 32b of the housing part 4a (see FIGS. 6b and 6c). FIG. 6a shows the housing part 4a with the valve disc 10 arranged so that it cannot rotate relative to the housing 4. In FIG. 6b, the valve disc 12 is also shown before, during and after the rotation of the insert 8 by 120°, as the valve disc 12 does not rotate in this angle range.

When the insert 8 is rotated in the angular range of 120° to 240°, the movement of the valve disc 12 is caused by entrainment by the insert 8, wherein the force transmission between the insert 8 and the valve disc 12 is realised with the aid of the end stops 38a, 38b of the insert 8 and the projections 52a, 52b of the valve disc 12.

After rotating the handle 6 and thus the insert 8 by 240°, the projections 52a, 52b of the valve disc 12 rest against both the end stops 38a, 38b of the insert and the end stops 34a, 34b of the housing part 4a, with the projection 52a resting against the end stop 34b and the projection 52b against the end stop 34a. This is shown in FIG. 6c, where only the passage opening 12c is not covered by the valve disc 10. In conjunction with FIG. 5d, where only the passage opening 12b is not covered by the valve disc 14, each passage opening 12b, 12c of the valve disc 12 is now covered. In this first position 62, the valve 2 is therefore completely closed. The overlap of the orifices 10b, 10c, 12b, 12c, 14b, 14c is now minimised and the flow cross-section 22 is closed.

When the insert 8 with the valve disc 14 is rotated by 240° relative to the housing 4 and therefore the housing part 4a, the valve disc 12 is rotated by 120° relative to the valve disc 14 and at the same time also by 120° relative to the valve disc 10. The rotation of the valve disc 12 takes place in the housing part 4a along the slide rails 32a, 23b and is limited by the end stops 34a (opposite 34b, concealed by housing part 4a), 34b. The slide rails 32a, 23b also each describe a circular arc κ with an angle of 120°. During this rotation, the valve disc 14 is therefore rotated by 240° relative to the valve disc 10. Overall, the insert 8 is therefore rotated by 240° relative to the housing 4.

Between the positions 62, 64 shown, infinitely variable control is also possible, so that the valve 2 is at least partially open for the flow of the medium in the intermediate positions.

The invention claimed is:

1. A valve for regulating the flow of a medium,
with a housing defining a fluid flow cross-section area and with at least three valve discs,
wherein at least one valve disc is arranged in the housing so as to be non-rotatable,
wherein at least two valve discs are arranged so as to be rotatable relative to the at least one valve disc arranged so as to be non-rotatable,
wherein the valve discs each have at least one passage opening,
wherein the passage openings are designed in such a way that in a first relative position of the valve discs the flow of the medium is blocked and in a second relative position it the flow of the medium is maximally open and
wherein the passage openings are designed in such a way that in the second relative position the passage openings of the valve discs expose an opening area of more than 50% of the flow cross-section area,
wherein
the valve discs have an identical geometry.

2. The valve according to claim 1, wherein the valve discs include a ceramic material.

3. The valve according to claim 1, wherein the passage openings are essentially designed in the form of circular sectors, and
that the circular sectors each have an opening angle α of greater than 180°.

4. The valve according to claim 1, wherein the valve discs each have at least two passage openings, that the passage openings are essentially designed in the form of circular sectors, and
that the circular sectors each have an opening angle α of greater than 90°.

5. The valve according to claim 1, wherein
a driver structure is provided for rotating the rotatable valve discs from the first position into the second position of the valve discs, and
that the driver construction causes the rotation of at least one second rotatable valve disc upon rotation of at least one first rotatable valve disc.

6. The valve according to claim 5, wherein the housing has a rotatable insert, and
that the first rotatable valve disc is arranged in the insert in a rotationally fixed manner.

7. The valve according to claim 6, wherein
a handle is provided on the outside of the housing, and that actuation of the handle causes the insert to rotate.

8. The valve according to claim 1, wherein end stops are provided to limit the rotational movement of the rotatable valve discs.

9. The valve according to claim 8, wherein the end stops limit the rotational movement of a first rotatable valve disc to a rotation through a maximum angle β of 240°, relative to the at least one rotationally fixed valve disc and limit the rotational movement of at least one further rotatable valve disc to a rotation through a maximum angle γ of 120°, relative to the at least one rotationally fixed valve disc.

10. The valve according to claim 8, wherein the end stops limit the rotational movement of the rotatable valve discs in relation to each other of adjacent valve discs to the same maximum angle δ of 120°.

11. The valve according to claim 9, wherein the end stops limit the rotational movement of the rotatable valve discs in relation to each other of adjacent valve discs to the same maximum angle δ of 120°.

* * * * *

UNITED STATES PATENT AND TRADEMARK OFFICE
CERTIFICATE OF CORRECTION

Page 1 of 1

PATENT NO. : 12,404,937 B2
APPLICATION NO. : 18/577493
DATED : September 2, 2025
INVENTOR(S) : Jörg Rosenthal It is certified that error appears in the above-identified patent and that said Letters Patent is hereby corrected as shown below:

In the Claims

Column 14, Line 4, Claim 1, after "position" delete "it"

Signed and Sealed this
Twenty-eighth Day of October, 2025

John A. Squires
*Director of the United States Patent and Trademark Office*